(12) United States Patent
Li et al.

(10) Patent No.: US 12,304,820 B2
(45) Date of Patent: May 20, 2025

(54) SILICON CARBON COMPOSITE MATERIAL AND PREPARATION METHOD THEREOF, NEGATIVE ELECTRODE MATERIAL, NEGATIVE ELECTRODE PLATE, ELECTRODE ASSEMBLY, BATTERY, ELECTRIC EQUIPMENT, AND CARBON SUBSTRATE

(71) Applicant: CONTEMPORARY AMPEREX TECHNOLOGY CO., LIMITED, Fujian (CN)

(72) Inventors: Yuan Li, Ningde (CN); Xiaobin Dong, Ningde (CN); Zijian Lv, Ningde (CN); Liangbin Liu, Ningde (CN); Jiazheng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/795,082

(22) Filed: Aug. 5, 2024

(65) Prior Publication Data

US 2024/0391779 A1 Nov. 28, 2024

Related U.S. Application Data

(63) Continuation of application No. PCT/CN2022/108327, filed on Jul. 27, 2022.

(51) Int. Cl.
*C01B 32/05* (2017.01)

(52) U.S. Cl.
CPC .......... *C01B 32/05* (2017.08); *C01P 2002/08* (2013.01); *C01P 2004/03* (2013.01);
(Continued)

(58) Field of Classification Search
CPC .. C01B 32/05; C01P 2002/08; C01P 2004/03; C01P 2004/51; C01P 2004/61;
(Continued)

(56) References Cited

U.S. PATENT DOCUMENTS

2022/0059820 A1* 2/2022 Costantino ............ H01M 4/364

FOREIGN PATENT DOCUMENTS

| CN | 103682287 A | * | 3/2014 | ........ H01M 10/0525 |
| CN | 111261864 A |   | 6/2020 | |

(Continued)

OTHER PUBLICATIONS

International Search Report for PCT Application No. PCT/CN2022/108327, mailed Apr. 6, 2023.
(Continued)

*Primary Examiner* — Daniel S Gatewood
(74) *Attorney, Agent, or Firm* — K&L Gates LLP

(57) ABSTRACT

A silicon carbon composite material includes a carbon matrix and a silicon material, the carbon matrix has a cross-linked porous structure internally, and the silicon material is at least partially distributed in the cross-linked porous structure. A value of flexibility C1 of the silicon carbon composite material satisfies $0.4 \leq C1 \leq 2$. C1 is a factor by which a compression deformation variable of the silicon carbon composite material is scaled to be equal to its rebound deformation variable, representing flexibility of the silicon carbon composite material. When the C1 value satisfies $0.4 \leq C1 \leq 2$, the silicon carbon composite material has good flexibility, reducing overall impact of expansion stress of silicon on the silicon carbon composite material, and allowing for a certain degree of contractility of the carbon matrix framework, so that residual stress can be received and released, thereby maintaining overall stability of the silicon carbon composite material.

20 Claims, 6 Drawing Sheets

(52) U.S. Cl.
CPC ...... *C01P 2004/51* (2013.01); *C01P 2004/61* (2013.01); *C01P 2006/11* (2013.01); *C01P 2006/12* (2013.01); *C01P 2006/40* (2013.01)

(58) Field of Classification Search
CPC .............. C01P 2006/11; C01P 2006/12; C01P 2006/40; H01M 4/0471; H01M 4/133; H01M 4/134; H01M 4/36; H01M 2004/027; H01M 4/364; H01M 4/386; H01M 4/587; H01M 4/625; H01M 10/0525; Y02E 60/10
See application file for complete search history.

(56) References Cited

FOREIGN PATENT DOCUMENTS

| | | | |
|---|---|---|---|
| CN | 112661131 | A | 4/2021 |
| CN | 114051663 | A | 2/2022 |
| JP | 2012226937 | A | 11/2012 |

OTHER PUBLICATIONS

Written Opinion for PCT Application No. PCT/CN2022/108327, mailed Apr. 1, 2023.

\* cited by examiner

SILICON CARBON COMPOSITE MATERIAL AND PREPARATION METHOD THEREOF, NEGATIVE ELECTRODE MATERIAL, NEGATIVE ELECTRODE PLATE, ELECTRODE ASSEMBLY, BATTERY, ELECTRIC EQUIPMENT, AND CARBON SUBSTRATE

CROSS-REFERENCE TO RELATED APPLICATION

The present application is a continuation of international application No. PCT/CN2022/108327, filed Jul. 27, 2022, which is hereby incorporated by reference in its entirety.

TECHNICAL FIELD

This application relates to the field of battery technologies, and specifically, to a silicon carbon composite material and a preparation method therefor, a negative electrode material, a negative electrode plate, an electrode assembly, a battery, an electric apparatus, and a carbon matrix.

BACKGROUND

Silicon negative electrode materials have advantages such as high energy density, low potential for lithium intercalation, and abundant sources, and are expected to become the next generation of negative electrode material. However, silicon negative electrode materials expand substantially in volume during actual charging and discharging, and after a certain number of cycles, chalking and chipping occur on the electrode plate, substantially degrading battery performance.

SUMMARY

In view of the foregoing problem, this application provides a silicon carbon composite material and a preparation method therefor, a negative electrode material, a negative electrode plate, an electrode assembly, a battery, an electric apparatus, and a carbon matrix, which can reduce the influence of expansion stress of silicon on the silicon carbon composite material.

According to a first aspect, this application provides a silicon carbon composite material, including a carbon matrix and a silicon material. The carbon matrix has a cross-linked porous structure internally, and the silicon material is at least partially distributed in the cross-linked porous structure. A value of flexibility C1 of the silicon carbon composite material satisfies $0.4 \leq C1 \leq 2$, the flexibility being measured using the following method: applying a pressure of 2t (i.e., 2 torr) to the silicon carbon composite material, holding the pressure for 10 s and releasing the pressure for 100 s, repeating the operations until the pressure is held and released for 20 times, recording a compacted density P1 at the 1st pressure holding, a compacted density P2 at the 20th pressure holding, a compacted density P3 at the 1st pressure releasing, and a compacted density P4 at the 20th pressure releasing, and calculating $C1=(P4-P3)/(P2-P1)$.

In the technical solution of embodiments of this application, the silicon material is at least partially distributed in the carbon matrix with a cross-linked porous structure. In this application, C1 is a factor by which a compression deformation variable of the silicon carbon composite material is scaled to be equal to its rebound deformation variable, representing flexibility of the silicon carbon composite material. When the C1 value satisfies $0.4 \leq C1 \leq 2$, the silicon carbon composite material has good flexibility, reducing overall impact of expansion stress of silicon on the silicon carbon composite material, and allowing for a certain degree of contractility of the carbon matrix framework, so that residual stress can be received and released, thereby maintaining overall stability of the silicon carbon composite material.

In some embodiments, $0.8 \leq C1 \leq 2$. When the C1 value satisfies $0.8 \leq C1 \leq 2$, the silicon carbon composite material has good flexibility, reducing overall impact of expansion stress of silicon on the silicon carbon composite material, and allowing for a certain degree of contractility of the carbon matrix framework, so that residual stress can be received and released, thereby maintaining overall stability of the silicon carbon composite material.

In some embodiments, P2−P1 is defined as M1 and P4−P3 is defined as N1, where $0.05 \leq M1 \leq 0.18$ and $0.08 \leq N1 \leq 0.2$. Optionally, $0.08 \leq M1 \leq 0.15$ and $0.10 \leq N1 \leq 0.18$. In this application, M1 represents a change in the compacted density of the silicon carbon composite material from the 1st to the 20th pressure releasing, quantifying the degree of deformation of the silicon carbon composite material after several pressure releasing. When $0.05 \leq M1 \leq 0.18$, compressive performance of the silicon carbon composite material is relatively good. N1 represents a change in the compacted density of the silicon carbon composite material from the 1st to the 20th pressure holding, quantifying the degree of deformation of the silicon carbon composite material after being subject to the pressure for several times. When $0.04 \leq N1 \leq 0.2$, it is conducive for the holding of $0.8 \leq C1 \leq 2$, so that the silicon carbon composite material has good flexibility.

In some embodiments, the carbon matrix includes a first region and a second region in sequence along a direction extending from the center to a surface, and the carbon matrix is composed of the first region and the second region, where a volume of the second region is twice a volume of the first region, and a ratio of the number of pores with a pore size of 2 nm to 1000 nm in the first region to the number of pores with a pore size of 2 nm to 1000 nm in the second region is greater than 1. Optionally, a ratio of the number of pores with a pore size of 2 nm to 500 nm in the first region to the number of pores with a pore size of 2 nm to 500 nm in the second region is greater than 1. Optionally, a ratio of the number of pores with a pore size of 2 nm to 200 nm in the first region to the number of pores with a pore size of 2 nm to 200 nm in the second region is greater than 1. If there are more pores with a pore size of 2 nm to 1000 nm located in the first region near the center of the carbon matrix, more silicon material can be deposited in the pores near the center, and flexibility of the silicon carbon composite material is higher, that is, the C1 value of the silicon carbon composite material is higher. When the ratio of the number of pores with a pore size of 2 nm to 1000 nm in the first region to the number of pores with a pore size of 2 nm to 1000 nm in the second region is greater than 1, the C1 value satisfies $0.4 \leq C1 \leq 2$.

In some embodiments, a specific surface area SSA value of the silicon carbon composite material satisfies: $1 \text{ cm}^2/\text{g} \leq SSA \leq 10 \text{ cm}^2/\text{g}$. Optionally, the specific surface area SSA value of the silicon carbon composite material satisfies: $3 \text{ cm}^2/\text{g} \leq SSA \leq 7 \text{ cm}^2/\text{g}$. When the specific surface area SSA value of the silicon carbon composite material satisfies $1 \text{ cm}^2/\text{g} \leq SSA \leq 10 \text{ cm}^2/\text{g}$, surface defects of the silicon carbon composite material are less, which is conducive to formation of a stable SEI film and reducing irreversible lithium ion loss.

In some embodiments, the silicon carbon composite material satisfies: Dv10≤5 μm, Dv50≤8 μm, Dv90≤20 μm, and (Dv90−Dv10)/Dv50≥1.6. This helps improve the compacted density of the silicon carbon composite material during application, and improve electrical contact of active substance particles, thereby improving conductivity of the negative electrode plate.

In some embodiments, a powder compacted density PD of the silicon carbon composite material under a pressure of 5t (i.e., 5 torr) is ≤1.1 g/cm$^3$. The silicon carbon composite material with a powder compacted density PD equal to or smaller than 1.1 g/cm$^3$ under a pressure of 5t has a porous structure.

In some embodiments, the silicon material includes any one or more of a silicon-oxygen compound, elemental silicon, and a silicon alloy. Silicon materials have advantages such as high energy density, low potential for lithium intercalation, and abundant sources. The silicon-oxygen compound, elemental silicon, and silicon alloy can be loaded into the pores of the carbon matrix to produce the silicon carbon composite material, which is used to produce a negative electrode material and batteries with high energy density.

According to a second aspect, this application provides a preparation method for the silicon carbon composite material in the foregoing embodiment, including subjecting raw materials to first heat treatment to produce a solid resin, subjecting the solid resin that has been crushed to second heat treatment to volatilize a neutral solvent and produce a carbon precursor, subjecting the carbon precursor to pyrolysis and carbonization treatment to produce the carbon matrix, and incorporating the silicon material into the cross-linked porous structure of the carbon matrix. The raw materials include a resin, a porogen, and the neutral solvent.

In the technical solution of embodiments of this application, the raw materials including the resin, porogen, and neutral solvent are subjected to the first heat treatment to form the solid resin, which is conducive to subsequent processing. The crushed solid resin is then subjected to the second heat treatment to volatilize the solvent, so that pores are in communication with each other to form the cross-linked porous structure, thus obtaining the carbon precursor. The carbon precursor is subjected to the pyrolysis and carbonization treatment to carbonize organic matter, thus obtaining the carbon matrix. In the preparation method for the silicon carbon composite material in this application, by using an in-situ pore formation method, the cross-linked porous structure is distributed inside and on the surface of the obtained carbon matrix, and pore sizes are appropriate, which is conducive to filling and dispersion of the silicon material in the pores of the carbon matrix, thereby preparing a more stable structure of the silicon carbon composite material.

In some embodiments, the second heat treatment is conducted at a treatment temperature of 150° C. to 400° C. for a treatment time of at least 10 hours. Choosing an appropriate treatment temperature and an appropriate treatment time for the second heat treatment helps the solvent volatilize, so that the pores are in communication with each other to form the cross-linked porous structure. If the temperature is too high, the pores of the prepared silicon carbon composite material become larger, the silicon carbon composite material becomes brittle, and the C1 value of the silicon carbon composite material decreases.

In some embodiments, a mass ratio of the resin to the neutral solvent ranges from 1:10 to 10:1, and a mass ratio of the resin to the porogen ranges from 1:5 to 10:1. Optionally, the resin includes any one or more of phenolic resin, epoxy resin, and polyurethane. Optionally, the neutral solvent includes any one or more of methanol, ethanol, ethylene glycol, polyethylene glycol, glycerol, and isopropanol. Optionally, the porogen includes any one or more of potassium chloride, sodium chloride, zinc chloride, sodium hydroxide, potassium hydroxide, sodium carbonate, potassium carbonate, sodium bicarbonate, phosphoric acid, sodium acetate, zinc acetate, nickel acetate, and ammonium acetate. Choosing an appropriate ratio of the resin to the neutral solvent helps control the number and size of the pores in the prepared silicon carbon composite material.

In some embodiments, the first heat treatment includes standing at 60° C. to 150° C. for at least 10 hours. Choosing an appropriate treatment temperature and an appropriate treatment time for the first heat treatment is conducive to obtaining the solid resin.

In some embodiments, the pyrolysis and carbonization treatment includes sintering at 600° C. to 1600° C. for 1 to 3 hours. Optionally, the pyrolysis and carbonization treatment is conducted at a temperature of 800° C. to 1000° C. Choosing an appropriate treatment temperature and an appropriate treatment time for the pyrolysis and carbonization treatment is conducive to obtaining the carbon matrix, and the cross-linked porous structure is distributed inside and on the surface of the carbon matrix.

According to a third aspect, this application provides a negative electrode material, including the silicon carbon composite material according to the foregoing embodiments or a silicon carbon composite material prepared according to the preparation method for the silicon carbon composite material according to the foregoing embodiments.

According to a fourth aspect, this application provides a negative electrode plate, including the negative electrode material according to the foregoing embodiments.

According to a fifth aspect, this application provides an electrode assembly, including the negative electrode plate according to the foregoing embodiments.

According to a sixth aspect, this application provides a battery cell, including the electrode assembly according to the foregoing embodiments.

According to a seventh aspect, this application provides a battery, including the battery cell according to the foregoing embodiments.

According to an eighth aspect, this application provides an electric apparatus, including the battery according to the foregoing embodiments, where the battery is configured to supply electric energy.

According to a ninth aspect, this application provides a carbon matrix with a cross-linked porous structure internally. A value of flexibility C2 of the carbon matrix satisfies 0.8≤C2≤2, the flexibility being measured using the following method: applying a pressure of 2t to the carbon matrix, holding the pressure for 10 s and releasing the pressure for 100 s, repeating the operation until the pressure is held and released for 20 times, recording a compacted density P5 at the 1st pressure holding, a compacted density P6 at the 20th pressure holding, a compacted density P7 at the 1st pressure releasing, and a compacted density P8 at the 20th pressure releasing, and calculating C2=N2/M2=(P8−P7)/(P6−P5). Optionally, 1.2≤C2≤1.8.

In the technical solution of embodiments of this application, C2 is a factor by which a compression deformation variable of the carbon matrix is scaled to be equal to its rebound deformation variable, representing flexibility of the carbon matrix. When the C2 value satisfies 0.8≤C2≤2, the carbon matrix has relatively good flexibility.

In some embodiments, M2 is defined as P6−P5 and N2 is defined as P8−P7, where 0.04≤M2≤0.18, and 0.04≤N2≤0.08. In this application, M2 represents a change in the compacted density of the carbon matrix from the 1st to the 20th pressure releasing, quantifying the degree of deformation of the silicon carbon composite material after several pressure releasing. When 0.05≤M2≤0.18, compressive performance of the carbon matrix is relatively good. N2 represents a change in the compacted density of the carbon matrix from the 1st to the 20th pressure holding, quantifying the degree of deformation of the silicon carbon composite material after being subject to the pressure for several times. When 0.08≤N2≤0.2, it is conducive for the holding of 0.8≤C2≤2, so that the carbon matrix has good flexibility.

In some embodiments, the carbon matrix includes a first region and a second region in sequence along a direction extending from the center to a surface, where a volume of the second region is twice a volume of the first region, and a ratio of the number of pores with a pore size of 2 nm to 1000 nm in the first region to the number of pores with a pore size of 2 nm to 1000 nm in the second region is greater than 1. Optionally, a ratio of the number of pores with a pore size of 2 nm to 500 nm in the first region to the number of pores with a pore size of 2 nm to 500 nm in the second region is greater than 1. Optionally, a ratio of the number of pores with a pore size of 2 nm to 200 nm in the first region to the number of pores with a pore size of 2 nm to 200 nm in the second region is greater than 1. If there are more pores with a pore size of 2 nm to 1000 nm located in the first region near the center of the carbon matrix, more silicon material can be deposited in the pores near the center, and flexibility of the carbon matrix is higher, that is, the C2 value of the carbon matrix is higher. When the ratio of the number of pores with a pore size of 2 nm to 1000 nm in the first region to the number of pores with a pore size of 2 nm to 1000 nm in the second region is greater than 1, the C2 value satisfies 0.8≤C2≤2.

The above descriptions are merely an overview of the technical solutions of this application. To understand technical means of this application more clearly, the technical means may be implemented in accordance with contents of this specification. To make the above and other purposes, features, and advantages of this application more comprehensible, the following implementations of this application are specifically given as examples.

BRIEF DESCRIPTION OF DRAWINGS

Other advantages and benefits become apparent to persons of ordinary skill in the art by reading detailed descriptions of the following preferred implementations. The accompanying drawings are merely intended to illustrate the preferred implementations and are not intended to limit this application. Throughout all the accompanying drawings, same reference signs represent same components. In the accompanying drawings.

Figure 1:
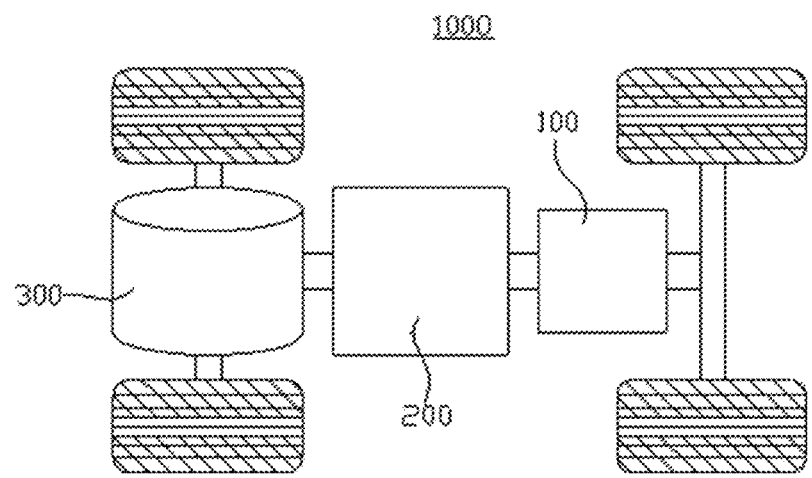
FIG. 1 is a schematic diagram depicting a structure of a vehicle according to some embodiments of this application.

Reference signals in descriptions of embodiments are as follows:

1000. vehicle;
100. battery; 200. controller; 300. motor;
10. box; 11. first part; 12. second part;
20. battery cell; 21. end cover; 22. housing; 23. electrode assembly;
400. carbon matrix particle; 410. first region; and 420. second region.

DETAILED DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used in this specification shall have the same meanings as commonly understood by those skilled in the art to which this application relates. The terms used in the specification are intended to merely describe the specific embodiments rather than to limit this application. The terms "include", "comprise", and any variations thereof in the specification and claims of this application as well as the foregoing description of drawings are intended to cover non-exclusive inclusions.

In the description of the embodiments of this application, the terms "first", "second", and the like are merely intended to distinguish between different objects, and shall not be understood as any indication or implication of relative importance or any implicit indication of the number, sequence or primary-secondary relationship of the technical features indicated. In the description of the embodiments of this application, the meaning of "a plurality of" is more than two, unless otherwise specifically defined.

Reference to "embodiment" in this specification means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described in this specification may combine with another embodiment.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the descriptions of the embodiments of this application, the term "a plurality of" means more than two (including two). Similarly, "a plurality of groups" means more than two groups (including two groups), and "a plurality of pieces" means more than two pieces (including two pieces).

In the descriptions of the embodiments of this application, the orientations or positional relationships indicated by the technical terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to facilitate the descriptions of the embodiments of this application and simplify the descriptions, are not intended to indicate or imply that the apparatuses or components mentioned in this application must have specific orientations, or be constructed and operated for a specific orientation, and therefore shall not be construed as a limitation to the embodiments of this application.

In the descriptions of the embodiments of this application, unless otherwise specified and defined explicitly, the technical terms "mounted", "interconnected", "connected", and "fastened" are to be interpreted broadly, for example, may be fixedly connected, or detachably connected, or integrated, may be mechanically connected or electrically connected, and may be directly connected or indirectly connected through an intermediate medium, or internally communicated between two elements or interacted between two elements. Persons of ordinary skill in the art can understand specific meanings of these terms in the embodiments of this application as appropriate to specific situations.

Currently, in terms of the market development, traction batteries are becoming increasingly widely used. Traction batteries are not only used in energy storage power systems such as hydropower, firepower, wind power, and solar power plants, but also widely used in electric vehicles such as electric bicycles, electric motorcycles, and electric cars, and in various fields such as military equipment and aerospace. With continuous expansion of an application field of traction batteries, a market demand thereof is also constantly increasing.

The inventors have found that silicon negative electrode materials have energy density as high as 4200 mAh/g and have advantages such as low potential for lithium interca-lation and abundant sources, and are expected to become the next generation of negative electrode material. However, silicon negative electrode materials expand substantially in volume during actual charging and discharging, and after a certain number of cycles, chalking and chipping occur on the electrode plate, substantially degrading battery performance.

To alleviate a swelling problem of the silicon negative electrode materials, the inventors have found through research that improvements can be made in two aspects. First, silicon is processed to become nano-sized. In this case, nano silicon particles have smaller stress and strain. However, nano silicon particles have problems in terms of preparation, dispersion, and high active surface, so that the nano particles are difficult to process. Second, nano silicon incorporates with the carbon matrix. In this case, if graphite, hard carbon, graphene, or carbon nanotubes are used to separate and encapsulate silicon, or reserve a swelling space for the active silicon, silicon enhances structural stability by incorporating a carbon matrix. A common incorporation method includes liquid phase coating (asphalt, resin, and the like) and gas phase coating (acetylene and various alkanes), and carbon layers formed by using such method are a rigid carbon structure. Such structure is prone to rupture when the stress exceeds beyond a threshold, and collapses due to lack of elasticity in a contracting process, so that stress has an extremely limited range.

Given the above considerations, to alleviate swelling of the silicon negative electrode material and enhance contractility of the silicon negative electrode material, through in-depth research, the inventor has designed a silicon carbon composite material, where a silicon material is at least partially distributed in a carbon matrix with a cross-linked porous structure. C1 is a factor by which a compression deformation variable of the silicon carbon composite material is scaled to be equal to its rebound deformation variable, representing flexibility of the silicon carbon composite material. When the C1 value satisfies $0.4 \leq C1 \leq 2$, the silicon carbon composite material has good flexibility, reducing overall impact of expansion stress of silicon on the silicon carbon composite material, and allowing for a certain degree of contractility of the carbon matrix framework, so that residual stress can be received and released, thereby maintaining overall stability of the silicon carbon composite material.

The battery mentioned in the embodiments of this application means a single physical module that includes one or more battery cells for providing a higher voltage and capacity. A battery typically includes a battery box configured to encapsulate one or more battery cells. The battery box can prevent liquids or other foreign objects from affecting the charging or discharging of the battery cells.

The battery cell may include a lithium-ion secondary battery cell, a lithium-ion primary battery cell, a lithium-sulfur battery cell, sodium-lithium-ion battery cell, a sodium-ion battery cell, a magnesium-ion battery cell, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell.

The battery cell includes an electrode assembly and an electrolyte. The electrode assembly includes a positive electrode plate, a negative electrode plate, and a separator. The battery cell operates relying on the migration of metal ions between the positive electrode plate and negative electrode plate. The positive electrode plate includes a positive electrode current collector and a positive electrode active substance layer. The positive electrode active substance layer is applied on a surface of the positive electrode current collector. A part of the positive electrode current collector uncoated with the positive electrode active substance layer protrudes from a part of the positive electrode current collector coated with the positive electrode active substance layer, and the part of positive electrode current collector uncoated with the positive electrode active substance layer acts as a positive tab. Using the lithium-ion battery as an example, a material of the positive electrode current collector may be aluminum, and the positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. A part of the negative electrode current collector uncoated with the negative electrode active substance layer protrudes from a part of the negative electrode current collector coated with the negative electrode active substance layer, and the part of negative electrode current collector uncoated with the negative electrode active substance layer acts a negative tab. A material of the negative electrode current collector may be copper, and the negative electrode active substance can be carbon, silicon, or the like. To ensure that a high current can pass without fusing, the positive tab is provided in plurality, and the plurality of positive tabs are stacked together; and the negative tab is provided in plurality, and the plurality of negative tabs are stacked together. A material of the separator may be polypropylene (polypropylene, PP), polyethylene (polyethylene, PE), or the like. In addition, the electrode assembly may have a winding structure or a laminated structure. This embodiment of this application is not limited thereto.

The battery cell further includes a current collecting component. The current collecting component is configured to electrically connect a tab and an electrode terminal of the battery cell, so as to transfer electric energy from the electrode assembly to the electrode terminal, and then to the outside of the battery cell through the electrode terminal. A plurality of battery cells are electrically connected by using the current collecting component to implement connection in series, parallel, or series-parallel between the plurality of battery cells.

The battery further includes a sampling terminal and a battery management system. The sampling terminal is connected to the current collecting component to collect information about the battery cells, such as voltage or temperature. The sampling terminal sends the collected information about the battery cell to the battery management system. When the battery management system detects that the information of the battery cell exceeds beyond a normal range, the battery management system limits output power of the battery to implement safety protection.

In should be understood that the electric apparatus applicable to the batteries descried in the embodiments of this application may be in different forms, for example, a mobile phone, a portable device, a notebook computer, an electric bicycle, an electric car, a ship, a spacecraft, an electric toy, and an electric tool. For example, the spacecraft includes an airplane, a rocket, a space shuttle, a spaceship, and the like. The electric toy includes a fixed or mobile electric toy, for example, a game console, an electric car toy, an electric ship toy, an electric aircraft toy, and the like. The electric tool includes an electric metal cutting tool, an electric grinding tool, an electric assembly tool, and an electric railway-purpose tool, for example, an electric drill, an electric bench grinder, an electric wrench, an electric screwdriver, an electric hammer, an electric impact drill, a concrete blender, and an electric planer.

The battery cell and the battery described in the embodiments of this application are not only applicable to the electric apparatus described above, but also applicable to all electric apparatuses that use the battery cells and batteries. However, for brevity of description, the following embodiments all use electric cars as examples for illustration.

Referring to FIG. 1, FIG. 1 is a schematic diagram depicting a structure of a vehicle according to some embodiments of this application. The vehicle 1000 may be a fuel vehicle, a gas vehicle, or a new energy vehicle, and the new energy vehicle may be a battery electric vehicle, a hybrid electric vehicle, an extended range electric vehicle, or the like. The vehicle 1000 is provided with a battery 100 inside, and the battery 100 may be disposed at the bottom, front, or back of the vehicle 1000. The battery 100 may be configured to supply power for the vehicle 1000, for example, configured as an operational power source for the vehicle 1000. The vehicle 1000 may further include a controller 200 and a motor 300. The controller 200 is configured to control the battery 100 to supply power to the motor 300, for example, the battery 100 is configured for a working electricity demand during start, navigation, and operation of the vehicle 1000.

According to some embodiments of this application, the battery 100 may be used not only as the operational power source for the vehicle 1000 but also as a driving power source for the vehicle 1000, completely or partially replacing fossil fuel or natural gas to provide driving power for the vehicle 1000.

Figure 2:
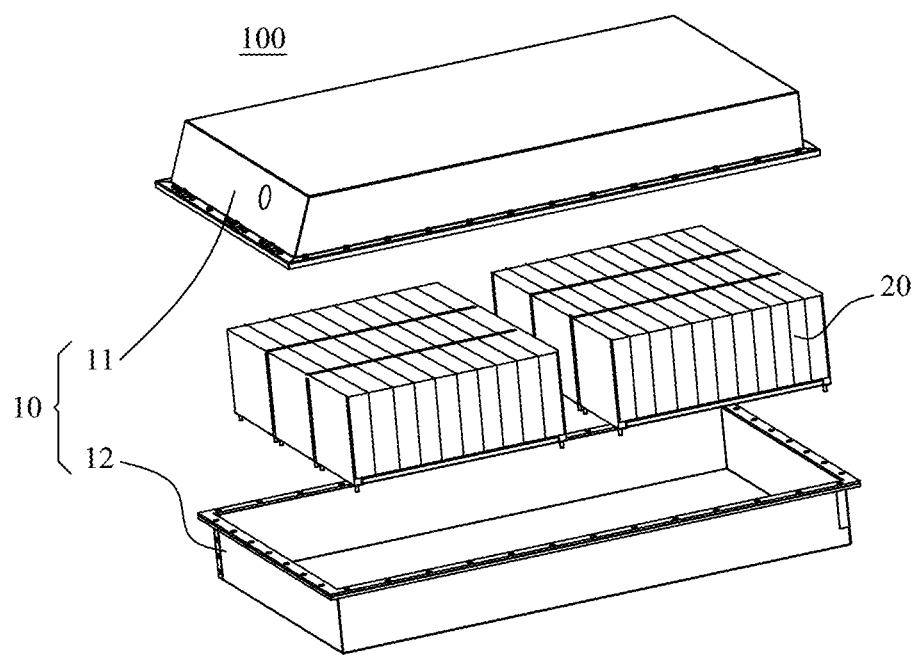
FIG. 2 is an exploded view depicting a structure of a battery according to some embodiments of this application.

Referring to FIG. 2, FIG. 2 is an exploded view of a battery provided in some embodiments of this application. The battery 100 may further include a box 10 and a battery cell 20, and the battery cell 20 is accommodated in the box 10. The box 10 is configured to provide an accommodating space for the battery cell 20, and the box 10 has various structures. In some embodiments, the box 10 may include a first part 11 and a second part 12, the first part 11 and the second part 12 cover each other, and the first part 11 and the second part 12 jointly define an accommodating space to accommodate the battery cell 20. The second part 12 may be a hollow structure with an opening at one end, the first part 11 may be a plate-like structure, and the first part 11 covers a side of the second part 12 with an opening, so that the first part 11 and the second part 12 jointly define an accommodating space. Both the first part 11 and the second part 12 may alternatively be hollow structures with an opening on one side, and a side of the first part 11 with an opening covers a side of the second part 12 with an opening. Certainly, the box 10 formed by the first part 11 and the second part 12 may be various shapes, such as a cylinder, a cuboid, and the like.

In the battery 100, the battery cell 20 may be provided in plurality, and the plurality of battery cells 20 may be connected in series, parallel, or series-parallel. The series-parallel connection means a combination of the series connection and parallel connection in the plurality of battery cells 20. The plurality of battery cells 20 may be directly connected in series, parallel, or series-parallel, and a whole constituted by the plurality of battery cells 20 is accommodated in the box 10. Certainly, the plurality of battery cells 20 may first be connected in series, parallel, or series-parallel to constitute the battery 100 as a battery module, then a plurality of the battery modules are connected in series, parallel, or series-parallel to constitute a whole, and the whole is accommodated in the box 10. The battery 100 may further include other structures, for example, the battery 100 may further include a current collecting component used to implement electrical connection between the plurality of battery cells 20.

Each battery cell 20 may be a secondary battery or a primary battery, and may be, but is not limited to, a lithium-sulfur battery, a sodium-ion battery, or a magnesium-ion battery. The battery cell 20 may be cylindrical, flat, cuboid, or of other shapes.

Figure 3:
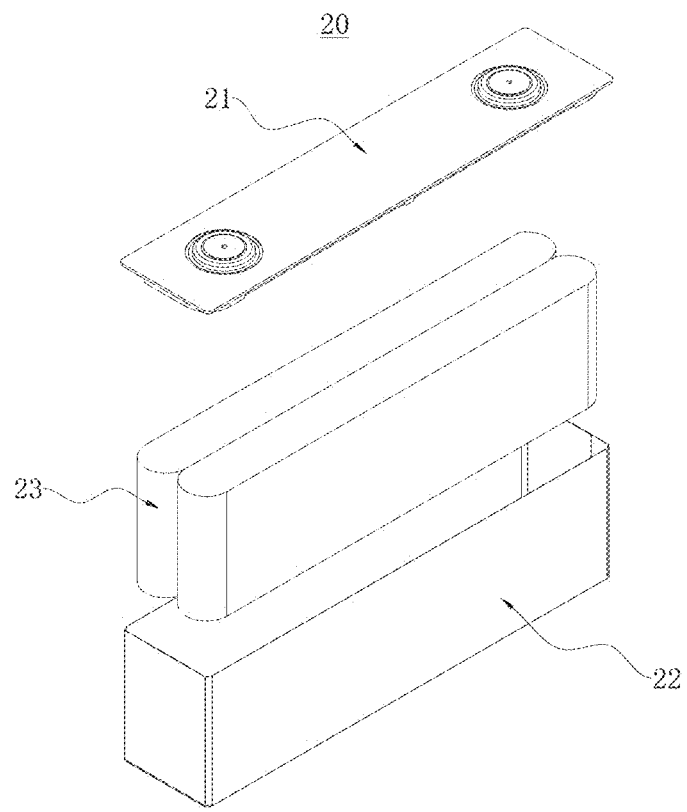
FIG. 3 is an exploded view depicting a structure of a battery cell according to some embodiments of this application.

Referring to FIG. 3, FIG. 3 is an exploded view depicting a structure of a battery cell provided in some embodiments of this application. The battery cell 20 means the smallest unit constituting a battery. As shown in FIG. 3, the battery cell 20 includes an end cover 21, a housing 22, an electrode assembly 23, and other functional components.

The end cover 21 means a component that covers an opening of the housing 22 to separate the internal environment of the battery cell 20 from the external environment. Unlimitedly, a shape of the end cover 21 can match a shape of the housing 22 to fit the housing 22. Optionally, the end cover 21 may be made of a material with a certain hardness and strength (for example, an aluminum alloy). In this way, the end cover 21 is less likely to deform when subjected to compression and collision, so that the battery cell 20 has higher structural strength and safety performance is improved. Functional components such as an electrode terminal may be disposed on the end cover 21. The electrode terminal may be configured to be electrical connected to the electrode assembly 23 to output or input electric energy of the battery cell 20. In some embodiments, the end cover 21 may further be provided with a pressure relief mechanism for releasing internal pressure when the internal pressure or temperature of the battery cell 20 has reached a threshold. The end cover 21 may also be various kinds of materials, such as copper, iron, aluminum, stainless steel, aluminum alloy, or plastic. This is not limited in the embodiments of this application. In some embodiments, an insulation member may further be disposed on an inner side of the end cover 21, and the insulation member may be configured to separate electrical connection components inside the housing 22 from the end cover 21 to reduce a risk of short circuit. For example, the insulation member may be plastic, rubber, and the like.

The housing 22 is an assembly configured to fit the end cover 21 to form the internal environment of the battery cell 20. The formed internal environment may be used to accommodate the electrode assembly 23, an electrolyte, and other components. The housing 22 and the end cover 21 may be separate components. An opening may be provided on the housing 22, and the end cover 21 covers the opening, so that the internal environment of the battery cell 20 is formed. Unlimitedly, the end cover 21 and the housing 22 may be integrally formed. Specifically, the end cover 21 and the housing 22 can first form a common connection surface before other components are put into the housing. When the inside of the housing 22 needs to be encapsulated, the end cover 21 can then cover the housing 22. The housing 22 may be various shapes and sizes, for example, a rectangular shape, a cylindrical shape, and a hexagonal prismatic shape. Specifically, the shape of housing 22 may be determined based on the specific shape and size of the electrode assembly 23. The housing 22 may be various kinds of materials, such as copper, iron, aluminum, stainless steel, aluminum alloy, or plastic. This is not limited in the embodiments of this application.

The electrode assembly 23 in the battery cell 20 is a component in which electrochemical reactions take place. The housing 22 may contain one or more electrode assemblies 23. The electrode assembly 23 is mainly formed by winding or stacking a positive and a negative plate, and typically a separator is disposed between the positive plate and the negative plate. Parts of the positive plate and the negative plate having active substances form a main body of the electrode assembly, while parts of the positive plate and the negative plate having no active substances each form a tab. A positive tab and a negative tab may be located at one end of the main body together or at two ends of the main body respectively. In a charging and discharging process of the battery, a positive active substance and a negative active substance react with the electrolyte, and the tabs are connected to the electrode terminals to form a current loop.

According to some embodiments of this application, this application provides a silicon carbon composite material, including a carbon matrix and a silicon material, the carbon matrix has a cross-linked porous structure internally, and the silicon material is at least partially distributed in the cross-linked porous structure. A value of flexibility C1 of the silicon carbon composite material satisfies $0.4 \leq C1 \leq 2$, the flexibility being measured using the following method: applying a pressure of 2t to the silicon carbon composite material, holding the pressure for 10 s and releasing the pressure for 100 s, repeating the operations until the pressure is held and released for 20 times, recording a compacted density P1 at the 1st pressure holding, a compacted density P2 at the 20th pressure holding, a compacted density P3 at the 1st pressure releasing, and a compacted density P4 at the 20th pressure releasing, and calculating $C1 = N1/M1 = (P4-P3)/(P2-P1)$.

The carbon matrix is a carrier into which the silicon material is loaded, and has a porous structure.

The silicon material is a single substance or a compound that can provide silicon atoms.

The cross-linked porous structure means a cross-linked structure formed in a way that pores inside the carbon matrix are in communication with each other. For example, a value of C1 may be 0.4, 0.5, 0.6, 0.7, 0.8, 0.9, 1.0, 1.1, 1.2, 1.3, 1.4, 1.5, 1.6, 1.7, 1.8, 1.9, or 2.0.

A calculation formula for the compacted density is as follows:

$$P = m/V = m/(S*H).$$

P is a compacted density of a powder measured in a unit of g/m. m is a mass of a sample measured in a unit of g. S is a bottom area of a mold measured in a unit of $cm^2$. H is a compacted height measured in a unit of cm.

Optionally, P1, P2, P3, and P4 all satisfies: $1 \text{ g/cm}^3 \leq Px \leq 2.0 \text{ g/cm}^3$, where x=1, 2, 3, or 4.

Optionally, $1 \text{ g/cm}^3 \leq Px \leq 1.5 \text{ g/cm}^3$.

It should be noted that the testing method for flexibility in this application is based on GB/T 24533-2009. The testing process is that in a compressive process under an eternal force, as the powder moves and deforms, gaps are filled and a contact area between particles increases, creating attraction between atoms and enhancing mechanical fit between the particles, so that a compressed part with a certain density is formed.

The silicon material is at least partially distributed in the carbon matrix with a cross-linked porous structure. In this application, C1 is a factor by which a compression deformation variable of the silicon carbon composite material is scaled to be equal to its rebound deformation variable, representing flexibility of the silicon carbon composite material. When the C1 value satisfies 0.4≤C1≤2, the silicon carbon composite material has good flexibility, reducing overall impact of expansion stress of silicon on the silicon carbon composite material, and allowing for a certain degree of contractility of the carbon matrix framework, so that residual stress can be received and released, thereby maintaining overall stability of the silicon carbon composite material.

According to some embodiments of this application, optionally, 0.8≤C1≤2.

When the C1 value satisfies 0.8≤C1≤2, the silicon carbon composite material has good flexibility, reducing overall impact of expansion stress of silicon on the silicon carbon composite material, and allowing for a certain degree of contractility of the carbon matrix framework, so that residual stress can be received and released, thereby maintaining overall stability of the silicon carbon composite material.

According to some embodiments of this application, optionally, P2−P1 is defined as M1 and P4−P3 is defined as N1, where 0.05≤M1≤0.18 and 0.08≤N1≤0.2.

For example, a value of M1 may be 0.05, 0.06, 0.07, 0.08, 0.09, 0.1, 0.11, 0.12, 0.13, 0.14, 0.15, 0.16, 0.17, or 0.18.

For example, a value of N1 may be 0.08, 0.09, 0.1, 0.11, 0.12, 0.13, 0.14, 0.15, 0.16, 0.17, 0.18, 0.19, or 0.2.

In this application, M1 represents a change in the compacted density of the silicon carbon composite material from the 1st to the 20th pressure releasing, quantifying the degree of deformation of the silicon carbon composite material after several pressure releasing. When 0.05≤M1≤0.18, compressive performance of the silicon carbon composite material is relatively good. N1 represents a change in the compacted density of the silicon carbon composite material from the 1st to the 20th pressure holding, quantifying the degree of deformation of the silicon carbon composite material after being subject to the pressure for several times. When 0.04≤N1≤0.2, it is conducive for the holding of 0.8≤C1≤2, so that the silicon carbon composite material has good flexibility.

Optionally, 0.08≤M1≤0.15 and 0.10≤N1≤0.18.

Figure 4:
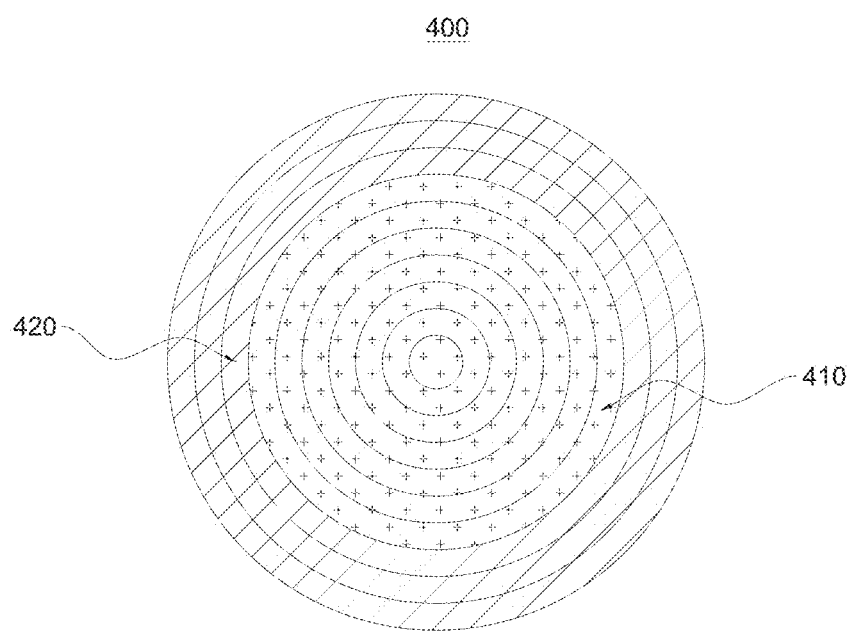
FIG. 4 is a schematic diagram depicting a structure of a carbon matrix particle according to some embodiments of this application.

According to some embodiments of this application, optionally, referring to FIG. 4, FIG. 4 is a schematic diagram depicting a structure of a carbon matrix particle according to some embodiments of this application. The carbon matrix includes a first region and a second region in sequence along a direction extending from the center to a surface, and the carbon matrix is composed of the first region and the second region, where a volume of the second region is twice a volume of the first region, and a ratio of the number of pores with a pore size of 2 nm to 1000 nm in the first region to the number of pores with a pore size of 2 nm to 1000 nm in the second region is greater than 1.

The first region is a center region of the carbon matrix, and the second region is a region that covers the first region in the carbon matrix. The first region and the second region can be divided through calculation. For example, carbon matrix particles are approximated as a sphere, and two identical volumes are calculated based on the radius of the carbon matrix particles and divided into the first region and the second region.

If there are more pores with a pore size of 2 nm to 1000 nm located in the first region near the center of the carbon matrix, more silicon material can be deposited in the pores near the center, and flexibility of the silicon carbon composite material is higher, that is, the C1 value of the silicon carbon composite material is higher. When the ratio of the number of pores with a pore size of 2 nm to 1000 nm in the first region to the number of pores with a pore size of 2 nm to 1000 nm in the second region is greater than 1, the C1 value satisfies 0.4≤C1≤2.

Optionally, a ratio of the number of pores with a pore size of 2 nm to 500 nm in the first region to the number of pores with a pore size of 2 nm to 500 nm in the second region is greater than 1.

Optionally, a ratio of the number of pores with a pore size of 2 nm to 200 nm in the first region to the number of pores with a pore size of 2 nm to 200 nm in the second region is greater than 1.

Optionally, referring to FIG. 4, a carbon matrix particle 400 is spherical or quasi spherical. The carbon matrix particle 400 is divided into 10 equal parts in a direction extending from the center to a surface according to distance to obtain 10 areas. The innermost area in the 10 areas includes the center. The first region 410 includes areas from the innermost area to the seventh innermost area, and the second region 420 includes the 3 outermost areas (from the eighth area to the tenth area).

According to some embodiments of this application, optionally, a specific surface area SSA value of the silicon carbon composite material satisfies: 1 cm$^2$/g≤SSA≤10 cm$^2$/g.

For example, the specific surface area SSA value of the silicon carbon composite material may be 1 cm$^2$/g, 2 cm$^2$/g, 3 cm$^2$/g, 4 cm$^2$/g, 5 cm$^2$/g, 6 cm$^2$/g, 7 cm$^2$/g, 8 cm$^2$/g, 9 cm$^2$/g, or 10 cm$^2$/g.

When the specific surface area SSA value of the silicon carbon composite material satisfies 1 cm$^2$/g≤SSA≤10 cm$^2$/g, surface defects of the silicon carbon composite material are less, which is conducive to formation of a stable SEI film and reducing irreversible lithium ion loss.

Optionally, the specific surface area SSA value of the silicon carbon composite material satisfies: 3 cm$^2$/g≤SSA≤7 cm$^2$/g.

According to some embodiments of this application, optionally, the silicon carbon composite material satisfies: Dv10≤5 μm, Dv50≤8 μm, Dv90≤20 μm, and (Dv90−Dv10)/Dv50≥1.6.

For example, a value of Dv10 of the silicon carbon composite material may be 0.1 μm, 0.5 μm, 1 μm, 2 μm, 3 μm, 4 μm, or 5μ m.

For example, a value of Dv50 of the silicon carbon composite material may be 1 μm, 2 μm, 3 μm, 4 μm, 5 μm, 6 μm, 7 μm, or 8 μm.

For example, a value of Dv90 of the silicon carbon composite material may be 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, or 20 μm.

This helps improve the compacted density of the silicon carbon composite material during application, and improve electrical contact of active substance particles, thereby improving conductivity of the negative electrode plate. According to some embodiments of this application, optionally, a powder compacted density PD of the silicon carbon composite material under a pressure of 5t is ≤1.1 g/cm$^3$.

For example, a value of the powder compacted density PD of the silicon carbon composite materials under a pressure of 5t may be 0.1 g/cm$^3$, 0.2 g/cm$^3$, 0.3 g/cm$^3$, 0.4 g/cm$^3$, 0.5 g/cm$^3$, 0.6 g/cm$^3$, 0.7 g/cm$^3$, 0.8 g/cm$^3$, 0.9 g/cm$^3$, 1 g/cm$^3$, or 1.1 g/cm$^3$.

The silicon carbon composite material with a powder compacted density PD equal to or smaller than 1.1 g/cm$^3$ under a pressure of 5t has a porous structure. According to some embodiments of this application, optionally, the silicon material includes any one or more of a silicon-oxygen compound, elemental silicon, and a silicon alloy.

Silicon materials have advantages such as high energy density, low potential for lithium intercalation, and abundant sources. The silicon-oxygen compound, elemental silicon, and silicon alloy can be loaded into the pores of the carbon matrix to produce the silicon carbon composite material, which is used to produce a negative electrode material and batteries with high energy density.

According to some embodiments of this application, this application further provides a preparation method for the silicon carbon composite material according to the foregoing embodiments, including: subjecting raw materials to first heat treatment to produce a solid resin, subjecting the solid resin that has been crushed to second heat treatment to volatilize a neutral solvent and produce a carbon precursor, subjecting the carbon precursor to pyrolysis and carbonization treatment to produce the carbon matrix, and incorporating the silicon material into the cross-linked porous structure of the carbon matrix. The raw materials include a resin, a porogen, and the neutral solvent.

The raw materials are prepared by dispersing the resin and the porogen in the neutral solvent.

The solid resin is a substance that appears as a solid state and includes the resin, the porogen, and the neutral solvent.

The crushed solid resin is prepared after steps of preliminary crushing, fine crushing, and grinding, so that the final prepared carbon matrix satisfies Dv10≤5 μm, Dv50≤8 μm, Dv90≤20 μm, and (Dv90−Dv10)/Dv50≥1.6.

The preliminary crushing includes using a double roller crusher and a whirlwind mill to crush a chunk of material into small pieces with an average diameter of about 1 cm.

Fine crushing is implemented by using a mechanical grinding stone disc mill. The first stage is that the crushing is implemented at a speed of 700 to 1000 r/min, and the second stage is that the fine crushing is implemented at a speed of 2000 to 2500 r/min, and the material is collected. After that, the second stage of the crushing process is repeated 2 to 3 times to produce fine material with a particle size less than 0.15 mm.

Grinding is implemented by using a jet mill. Air inside a chamber is exhausted, and an air pressure valve is adjusted to the maximum value (generally 0.5 Mpa). Then inlet air pressure, crushing pressure, and material feeding pressure are adjusted to 0.36 Mpa, 0.36 Mpa, and 0.34 Mpa respectively. Further, target samples are suck into a grinding chamber for crushing, and after 5 min, a gas valve and vibration switch are turned off, so as to collect the ground samples.

The raw materials including the resin, porogen, and neutral solvent are subject to the first heat treatment to form the solid resin, which is conducive to subsequent processing. The crushed solid resin is then subjected to the second heat treatment is to volatilize the solvent, so that pores are in communication with each other to form the cross-linked porous structure, thus obtaining the carbon precursor. The carbon precursor is subjected to the pyrolysis and carbonization treatment to carbonize organic matter, thus obtaining the carbon matrix. In the preparation method for the silicon carbon composite material in this application, by using an in-situ pore formation method, the cross-linked porous structure is distributed inside and on the surface of the obtained carbon matrix, and pore sizes are appropriate, which is conducive to filling and dispersion of the silicon material in the pores of the carbon matrix, thereby preparing a more stable structure of the silicon carbon composite material.

Optionally, before the raw materials are subjected to the first heat treatment, the raw materials are first transferred to a mold and left standing there.

Optionally, before the silicon material is incorporated into the cross-linked porous structure of the carbon matrix, it is necessary to obtain a carbon matrix that meets particle size requirements after steps of impurity removal, demagnetization, and grading.

Specifically, 2 tons of softened water is injected into an acid cleaning kettle, 1000 kg of target materials that need to be acid cleaned are added, a mode is selected to remove carbon floating on surface, and black water is discharged. The above steps are repeated until the discharged softened water is clean, and then approximately 3 to 5 wt % of hydrochloric acid is added. The amount added is based on a consideration of an initial pH value of the material and different amounts are added at different stages. Steaming is performed for more than 0.5 h, and then purified water is added and some black water overflows. A centrifuge starts and operates at a low speed. Subsequently, a discharge valve is opened and the water and the materials are injected into the centrifugal dehydration chamber for 10 min of dehydration. The centrifuge is accelerated to medium speed, spray reverse osmosis water into the water distribution pipe for rinsing for 20 min, and switch to high-speed centrifugal dehydration for 20 min; After the material is poured out, it is transferred to a drying furnace for further dehydration and drying until the water content is less than 5 wt %. In the acid cleaning process, fine powder and metal impurities are removed by overflowing, iron and magnetism are removed, and the dry material is further sieved and powder is collected by using a spin vibration sieve.

Optionally, the method of incorporating the silicon material into the cross-linked porous structure of the carbon matrix includes chemical vapor deposition.

According to some embodiments of this application, optionally, the second heat treatment is conducted at a treatment temperature of 150° C. to 400° C. for a treatment time of at least 10 hours.

For example, the treatment temperature for the second heat treatment may be 150° C., 180° C., 200° C., 220° C., 250° C., 280° C., 300° C., 330° C., 350° C., 370° C., or 400° C.

For example, the treatment time for the second heat treatment may be 10 h, 12 h, 14 h, 16 h, 18 h, or 20 h.

Choosing an appropriate treatment temperature and an appropriate treatment time for the second heat treatment helps the solvent volatilize, so that the pores are in communication with each other to form the cross-linked porous structure. If the temperature is too high, the pores of the prepared silicon carbon composite material become larger, the silicon carbon composite material become brittle, and the C1 value of the silicon carbon composite material decreases.

According to some embodiments of this application, optionally, a mass ratio of the resin to the neutral solvent ranges from 1:10 to 10:1, and a mass ratio of the resin to the porogen ranges from 1:5 to 10:1.

For example, the mass ratio of the resin to the neutral solvent may be 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, or 10:1.

For example, the mass ratio of the resin to the porogen may be 1:5, 1:4, 1:3, 1:2, 1:1, 2:1, 3:1, 4:1, 5:1, 6:1, 7:1, 8:1, 9:1, or 10:1.

Choosing an appropriate ratio of the resin to the neutral solvent helps control the number and size of the pores in the prepared silicon carbon composite material.

Optionally, the resin includes any one or more of phenolic resin, epoxy resin, and polyurethane.

Optionally, the neutral solvent includes any one or more of methanol, ethanol, ethylene glycol, polyethylene glycol, glycerol, and isopropanol.

Optionally, the porogen includes any one or more of potassium chloride, sodium chloride, zinc chloride, sodium hydroxide, potassium hydroxide, sodium carbonate, potassium carbonate, sodium bicarbonate, phosphoric acid, sodium acetate, zinc acetate, nickel acetate, and ammonium acetate.

According to some embodiments of this application, optionally, the first heat treatment includes standing at 60° C. to 150° C. for at least 10 hours.

For example, the treatment temperature for the first heat treatment may be 60° C., 70° C., 80° C., 90° C., 100° C., 110° C., 120° C., 130° C., 140° C., or 150° C.

For example, the treatment time for the first heat treatment may be 10 h, 12 h, 14 h, 16 h, 18 h, or 20 h.

Choosing an appropriate treatment temperature and an appropriate treatment time for the first heat treatment is conducive to obtaining the solid resin.

According to some embodiments of this application, optionally, the pyrolysis and carbonization treatment includes sintering at 600° C. to 1600° C. for 1 to 3 hours.

For example, the treatment temperature for the pyrolysis and carbonization treatment may be 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., 1450° C., or 1500° C.

For example, the treatment time for the pyrolysis and carbonization treatment may be 1 h, 1.5 h, 2 h, 2.5 h, or 3 h.

Choosing an appropriate treatment temperature for the pyrolysis and carbonization treatment is conducive to obtaining the carbon matrix, and the cross-linked porous structure is distributed inside and on the surface of the carbon matrix.

Optionally, the pyrolysis and carbonization treatment is conducted at a temperature of 800° C. to 1000° C.

According to some embodiments of this application, optionally, this application further provides a carbon matrix, and the carbon matrix has a cross-linked porous structure internally. A value of flexibility $C2$ of the carbon matrix satisfies $0.8 \leq C2 \leq 2$, the flexibility being measured using the following method: applying a pressure of 2t to the carbon matrix, holding the pressure for 10s and releasing the pressure for 100s, repeating the operation until the pressure is held and released for 20 times, recording a compacted density P5 at the 1st pressure holding, a compacted density P6 at the 20th pressure holding, a compacted density P7 at the 1st pressure releasing, and a compacted density P8 at the 20th pressure releasing, and calculating $C2=N2/M2=(P8-P7)/(P6-P5)$. Optionally, $1.2 \leq C2 \leq 1.8$.

For example, a value of C2 may be 0.8, 0.9, 1.0, 1.1, 1.2, 1.3, 1.4, 1.5, 1.6, 1.7, 1.8, 1.9, or 2.0.

In this application, C2 is a factor by which a compression deformation variable of the carbon matrix is scaled to be equal to its rebound deformation variable, representing flexibility of the carbon matrix. When the C2 value satisfies $0.8 \leq C2 \leq 2$, the carbon matrix has relatively good flexibility.

According to some embodiments of this application, optionally, M2 is defined as P6−P5 and N2 is defined as P8−P7, where $0.04 \leq M2 \leq 0.18$ and $0.04 \leq N2 \leq 0.08$.

For example, a value of M2 may be 0.04, 0.05, 0.06, 0.07, 0.08, 0.09, 0.1, 0.11, 0.12, 0.13, 0.14, 0.15, 0.16, 0.17, or 0.18.

For example, a value of N2 may be 0.04, 0.05, 0.06, 0.07, or 0.08.

In this application, M2 represents a change in the compacted density of the carbon matrix from the 1st to the 20th pressure releasing, quantifying the degree of deformation of the silicon carbon composite material after several pressure releasing. When $0.05 \leq M2 \leq 0.18$, compressive performance of the carbon matrix is relatively good. N2 represents a change in the compacted density of the carbon matrix from the 1st to the 20th pressure holding, quantifying the degree of deformation of the silicon carbon composite material after being subject to the pressure for several times. When $0.08 \leq N2 \leq 0.2$, it is conducive for the holding of $0.8 \leq C2 \leq 2$, so that the carbon matrix has good flexibility.

According to some embodiments of this application, optionally, the carbon matrix includes a first region and a second region in sequence along a direction extending from the center to a surface, where a volume of the second region is twice a volume of the first region, and a ratio of the number of pores with a pore size of 2 nm to 1000 nm in the first region to the number of pores with a pore size of 2 nm to 1000 nm in the second region is greater than 1.

If there are more pores with a pore size of 2 nm to 1000 nm located in the first region near the center of the carbon matrix, more silicon material can be deposited in the pores near the center, and flexibility of the carbon matrix is higher, that is, the C2 value of the carbon matrix is higher. When the ratio of the number of pores with a pore size of 2 nm to 1000 nm in the first region to the number of pores with a pore size of 2 nm to 1000 nm in the second region is greater than 1, the C2 value satisfies $0.8 \leq C2 \leq 2$.

It should be noted that the number of pores with a pore size of 2 nm to 1000 nm in the first region and the number of pores with a pore size of 2 nm to 1000 nm in the second region may be obtained by observing a scanning electron microscope image of a cross section of the carbon matrix.

Optionally, a ratio of the number of pores with a pore size of 2 nm to 500 nm in the first region to the number of pores with a pore size of 2 nm to 500 nm in the second region is greater than 1.

Optionally, a ratio of the number of pores with a pore size of 2 nm to 200 nm in the first region to the number of pores with a pore size of 2 nm to 200 nm in the second region is greater than 1.

The following further describes a silicon carbon composite material and a preparation method therefor, a negative electrode material, a negative electrode plate, an electrode assembly, a battery, and a carbon matrix in this application.

Example 1

An embodiment of this application provides a silicon carbon composite material and a preparation method therefor, a negative electrode material, a negative electrode plate, an electrode assembly, a battery, and a carbon matrix.

S1: Produce a carbon matrix.

50 g of phenolic resin with a solid content of 80% and 25 g of absolute ethanol were mixed to produce a first mixture. Then, 40 g of zinc chloride was added to the first mixture and stirred at a speed of 1000 r/min for 3 h to produce a raw material.

The raw material was transferred to a heated mold. Then the heated mold was placed in an air circulating oven and subjected to first heat treatment to produce a solid resin. The first heat treatment was conducted at a temperature of 80° C. for a time of 10 h. Next, the solid resin was subjected to preliminary crushing, fine crushing, and grinding to produce crushed solid resin, and the crushed solid resin was subjected to second heat treatment to volatilize a neutral solvent to produce a carbon precursor, where the second heat treatment was conducted at a temperature of 180° C. for a treatment time of 10 h. After that, the carbon precursor was subjected to pyrolysis and carbonization treatment to produce the carbon matrix, where the pyrolysis and carbonization treatment was conducted at a temperature of 1000° C. for a time of 2 h. Finally, carbon matrix produced was subjected to impurity removal, demagnetization, and grading to produce a carbon matrix that meets the particle size requirement.

In the carbon matrix, the ratio of the number of pores with a pore size of 2 nm to 1000 nm in the first region to the number of pores with a pore size of 2 nm to 1000 nm in the second region was 5.3, a value of C2 was 1.40, a value of M2 was 0.05, and a value of N2 was 0.07.

S2: Produce a silicon carbon composite material.

The silicon carbon composite material was prepared by uniformly dispersing nano silicon in the carbon matrix by chemical vapor deposition.

A value of C1 of the silicon carbon composite material was 1.7, a value of M1 was 0.06, a value of N1 was 0.1, a value of specific surface area SSA was 6 $cm^2/g$, Dv10 was 3.2 μm, Dv50 was 7 μm, Dv90 was 15 μm, and (Dv90−Dv10)/Dv50 was 1.7.

S3: Produce a negative electrode plate.

A negative electrode material (25 wt % silicon carbon composite material+75 wt % artificial graphite), a conductive agent, and a binder were mixed in proportion to produce a slurry. A weight percentage of the negative electrode material was not less than 95.5 wt %, the binder was sodium carboxymethyl cellulose, and the conductive agent was conductive carbon black. The slurry was evenly applied on a copper foil and dried at 80° C. in vacuum to produce a negative electrode plate (water content ≤5 ppm).

S4: Produce a battery.

The prepared negative electrode plate was assembled in a glove box for battery assembly. A lithium metal plate served as an electrode, and an electrolyte was a solvent of EC and DMC at a volume ratio of 1:1 which was dissolved with $LiPF_6$, where 10 v/v % of FEC was added.

A positive electrode plate, a separator, and the negative electrode plate were stacked in order, and were wound to produce an electrode assembly. The electrode assembly was placed in an outer package, and the electrolyte was injected, followed by packaging, standing, formation, aging, and other processes, to produce a secondary battery.

Comparative Example 1

A comparative example of this application provides a silicon carbon composite material and a preparation method therefor, a negative electrode material, a negative electrode plate, an electrode assembly, a battery, and a carbon matrix.

S1: Produce a carbon matrix.

50 g of phenolic resin with a solid content of 80%, 50 g of absolute ethanol, and 5 ml of phosphoric acid were mixed and stirred to produce a first mixture. A weight percentage of the phosphoric acid was 85 wt %. Then, 80 g of zinc chloride was added to the first mixture, and stirred for 1 h at a speed of 200 r/min to produce a raw material.

The raw material was left standing at room temperature (15 to 25° C.) for 3 h to produce a solid block, and residual solvent was removed from the solid block at 80° C. Then, the solid block was subjected to preliminary crushing, fine crushing, and grinding to produce a crushed solid block in light yellow. The crushed solid block was carbonized at 1000° C. for 2 h to produce a carbon matrix. Next, the carbon matrix produced was subjected to impurity removal, demagnetization, and grading to produce a carbon matrix that meets the particle size requirement.

In the carbon matrix, the ratio of the number of pores with a pore size of 2 nm to 1000 nm in the first region to the number of pores with a pore size of 2 nm to 1000 nm in the second region was 3, a value of C2 was 0.5, a value of M2 was 0.08, and a value of N2 was 0.04.

S2: Produce a silicon carbon composite material.

The silicon carbon composite material was prepared by uniformly dispersing nano silicon in the carbon matrix by chemical vapor deposition.

A value of C1 of the silicon carbon composite material was 0.29, a value of M1 was 0.14, a value of N1 was 0.04, a value of specific surface area SSA was 7 $cm^2/g$, Dv10 was 3 μm, Dv50 was 7.8 μm, Dv90 was 15.7 μm, and (Dv90−Dv10)/Dv50 was 1.63.

S3: Produce a negative electrode plate.

A negative electrode material (25 wt % silicon carbon composite material+75 wt % artificial graphite), a conductive agent, and a binder were mixed in proportion to produce a slurry. A weight percentage of the negative electrode material was not less than 95.5 wt %, the binder was sodium carboxymethyl cellulose, and the conductive agent was conductive carbon black. The slurry was evenly applied on a copper foil and dried at 80° C. in vacuum to produce a negative electrode plate (water content≤5 ppm).

S4: Produce a battery.

The prepared negative electrode plate was assembled in a glove box for battery assembly. A lithium metal plate served as an electrode, and an electrolyte was a solvent of EC and DMC at a volume ratio of 1:1 which was dissolved with $LiPF_6$, where 10 v/v % of FEC was added.

A positive electrode plate, a separator, and the negative electrode plate were stacked in order, and were wound to produce an electrode assembly. The electrode assembly was placed in an outer package, and the electrolyte was injected, followed by packaging, standing, formation, aging, and other processes, to produce a secondary battery.

Parameters of the carbon matrix and the silicon carbon composite material in Examples 1 to 25 and Comparative Examples 1 to 3 are shown in Table 1.

TABLE 1

Parameters of the carbon matrices and silicon carbon composite materials in Examples 1 to 25 and Comparative Examples 1 to 3

| | Carbon matrix | | | | Silicon carbon composite material | | | | | | | |
|---|---|---|---|---|---|---|---|---|---|---|---|---|
| Item | Ratio | C2 | M2 | N2 | C1 | M1 | N1 | SSA | Dv10 | Dv50 | Dv90 | (Dv90 − Dv10)/Dv50 |
| Example 1 | 5.3 | 1.40 | 0.05 | 0.07 | 1.7 | 0.06 | 0.1 | 6 | 3.2 | 7 | 15 | 1.7 |
| Example 2 | 7.2 | 1.00 | 0.05 | 0.05 | 0.4 | 0.18 | 0.08 | 6 | 2.5 | 8 | 20 | 2.2 |
| Example 3 | 3.1 | 0.8 | 0.05 | 0.04 | 0.9 | 0.1 | 0.09 | 4 | 3 | 6 | 18 | 2.5 |
| Example 4 | 2.1 | 1.6 | 0.05 | 0.08 | 1.6 | 0.05 | 0.08 | 4 | 2.1 | 7 | 17 | 2.1 |
| Example 5 | 7.3 | 1.14 | 0.07 | 0.08 | 1.6 | 0.05 | 0.08 | 10 | 2.2 | 8 | 17 | 1.9 |
| Example 6 | 8.2 | 1 | 0.04 | 0.04 | 1.6 | 0.05 | 0.08 | 8 | 2.8 | 7 | 15 | 1.7 |
| Example 7 | 9.5 | 1.2 | 0.05 | 0.06 | 1.7 | 0.06 | 0.1 | 8 | 2.4 | 8 | 18 | 2.0 |
| Example 8 | 15.1 | 1.6 | 0.05 | 0.08 | 2 | 0.05 | 0.1 | 5 | 2.2 | 7 | 15 | 1.8 |
| Example 9 | 14.2 | 1.33 | 0.06 | 0.08 | 1.3 | 0.08 | 0.1 | 3 | 2.3 | 8 | 16 | 1.7 |
| Example 10 | 12.1 | 1.25 | 0.08 | 0.1 | 1.6 | 0.05 | 0.08 | 2 | 2.1 | 5 | 10 | 1.6 |
| Example 11 | 2.8 | 0.63 | 0.08 | 0.05 | 1.7 | 0.09 | 0.15 | 5 | 2.3 | 5 | 12 | 1.9 |
| Example 12 | 8.3 | 1.17 | 0.06 | 0.07 | 1.5 | 0.06 | 0.09 | 8 | 2.7 | 7.9 | 15 | 1.6 |
| Example 13 | 9.8 | 1.14 | 0.07 | 0.08 | 1.5 | 0.08 | 0.12 | 6 | 2.3 | 7.5 | 15.7 | 1.8 |
| Example 14 | 8.5 | 1.17 | 0.06 | 0.07 | 1.57 | 0.07 | 0.11 | 6 | 2.4 | 7.9 | 16.8 | 1.8 |
| Example 15 | 9.5 | 1.4 | 0.05 | 0.07 | 1.14 | 0.07 | 0.08 | 7 | 2.1 | 7.8 | 17.5 | 1.97 |
| Example 16 | 12.2 | 1.5 | 0.06 | 0.09 | 1.8 | 0.05 | 0.09 | 8 | 2.7 | 7.2 | 17.1 | 2 |
| Example 17 | 7.5 | 2 | 0.05 | 0.1 | 1.6 | 0.05 | 0.08 | 6 | 2.6 | 7.4 | 17.9 | 2.07 |
| Example 18 | 7.5 | 1.29 | 0.07 | 0.09 | 1.33 | 0.06 | 0.08 | 7 | 2.8 | 6.9 | 15.8 | 1.89 |
| Example 19 | 8.5 | 1.71 | 0.07 | 0.12 | 1.43 | 0.07 | 0.1 | 8 | 2.8 | 6.7 | 12.8 | 1.50 |
| Example 20 | 9.5 | 2 | 0.05 | 0.1 | 1.25 | 0.12 | 0.15 | 8 | 2.4 | 7.5 | 17.4 | 2 |
| Example 21 | 7.5 | 2.14 | 0.07 | 0.15 | 1.3 | 0.1 | 0.13 | 5 | 2 | 6.7 | 13.7 | 1.75 |
| Example 22 | 5.8 | 0.89 | 0.09 | 0.08 | 1.33 | 0.06 | 0.08 | 6 | 3.2 | 7.2 | 16.8 | 1.89 |
| Example 23 | 6 | 1.4 | 0.05 | 0.07 | 0.88 | 0.08 | 0.07 | 6 | 3.5 | 7.5 | 15.8 | 1.64 |
| Example 24 | 2.5 | 2.25 | 0.04 | 0.09 | 0.44 | 0.18 | 0.08 | 7 | 2.5 | 7.2 | 12.6 | 1.40 |
| Example 25 | 2 | 0.71 | 0.07 | 0.05 | 0.5 | 0.12 | 0.06 | 6 | 2.2 | 6.4 | 13.2 | 1.72 |
| Comparative Example 1 | 3 | 0.5 | 0.08 | 0.04 | 0.29 | 0.14 | 0.04 | 7 | 3 | 7.8 | 15.7 | 1.63 |
| Comparative Example 2 | 8.5 | 0.38 | 0.13 | 0.05 | 0.23 | 0.13 | 0.03 | 6 | 2.6 | 6.8 | 13.7 | 1.63 |
| Comparative Example 3 | 3 | 0.17 | 0.12 | 0.02 | 0.36 | 0.11 | 0.04 | 6 | 4.2 | 10.5 | 22.3 | 1.72 |

The ratio in Table 1 is a ratio of the number of pores with a pore size of 2 nm to 1000 nm in the first region to the number of pores with a pore size of 2 nm to 1000 nm in the second region.

Test Example 1

Figure 5:
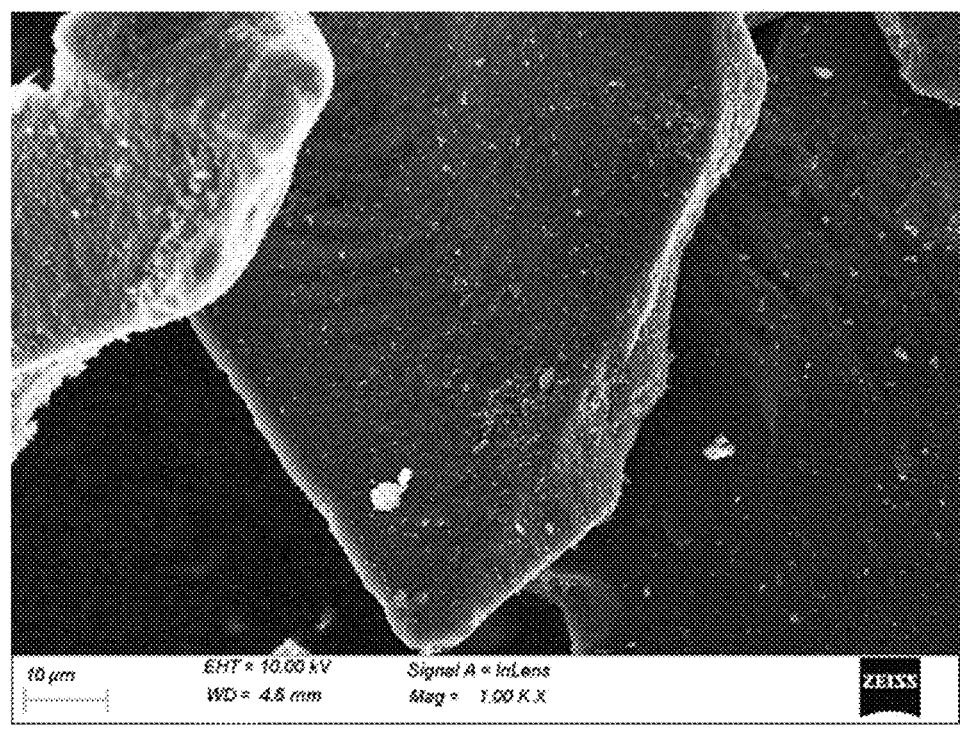
FIG. 5 is a scanning electron microscope image of a surface of a carbon matrix according to Example 1 of this application at a scanning magnification factor of Mag=1.00 KX.
Figure 6:
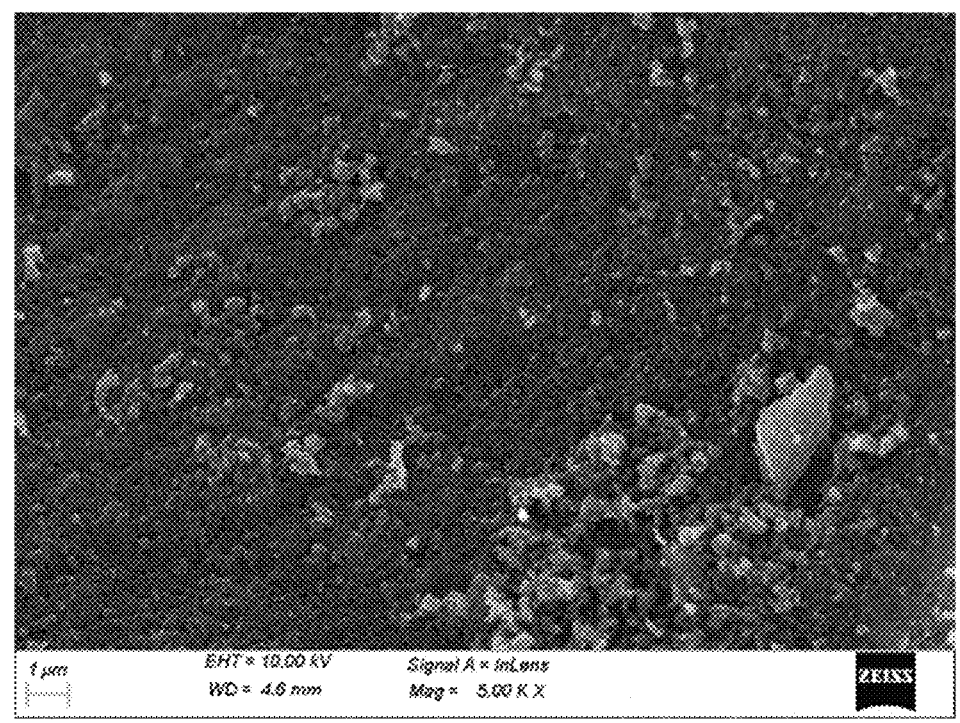
FIG. 6 is a scanning electron microscope image of a surface of a carbon matrix according to Example 1 of this application at a scanning magnification factor of Mag=5.00 KX.
Figure 7:
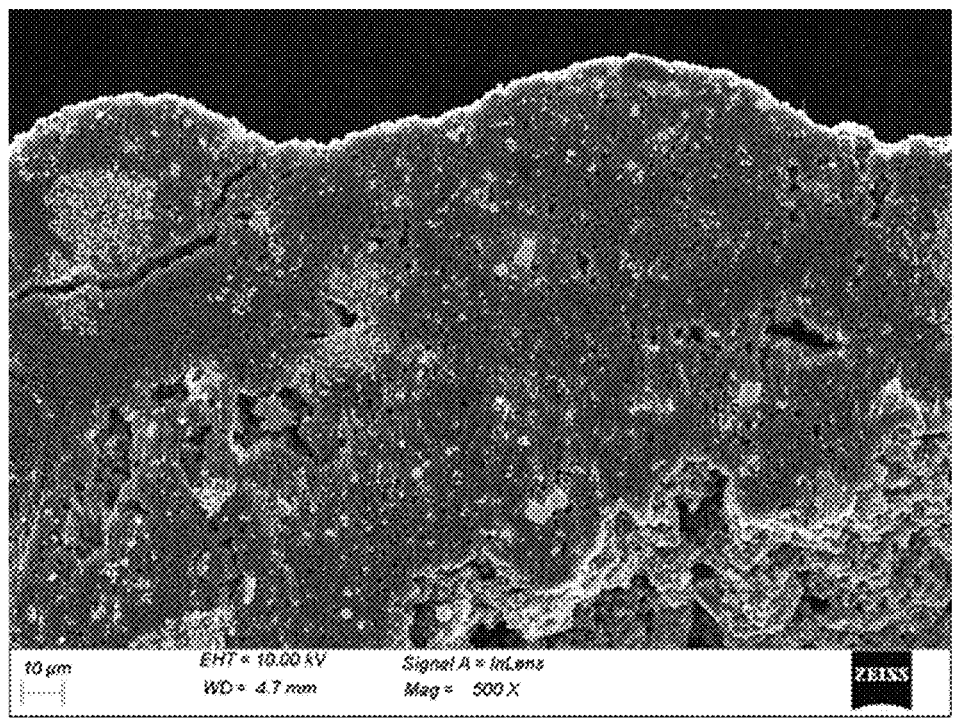
FIG. 7 is a scanning electron microscope image of a cross section of a carbon matrix according to Example 1 of this application at a scanning magnification factor of Mag=1.00 KX.
Figure 8:
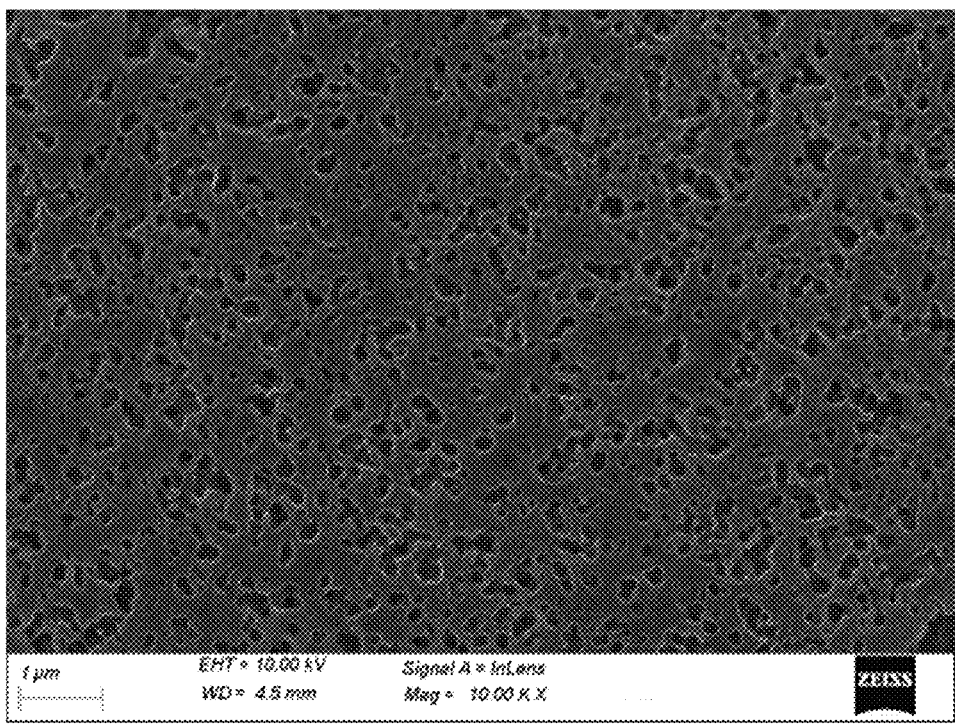
FIG. 8 is a scanning electron microscope image of a cross section of a carbon matrix according to Example 1 of this application at a scanning magnification factor of Mag=5.00 KX.
Figure 9:
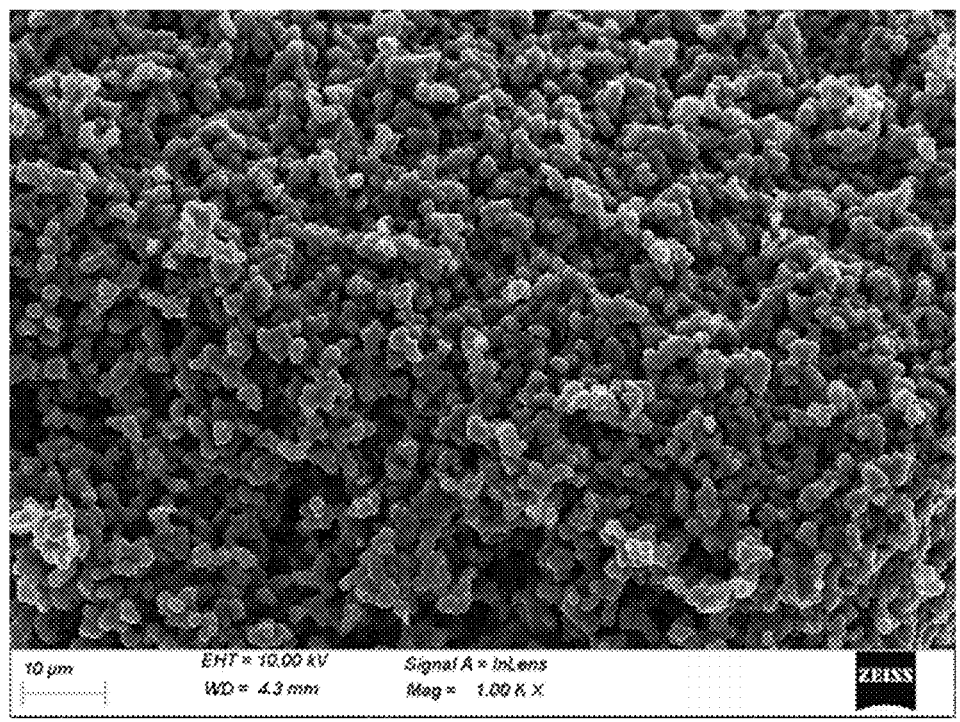
FIG. 9 is a scanning electron microscope image of a surface of a carbon matrix according to Comparative Example 1 of this application at a scanning magnification factor of Mag=1.00 KX.
Figure 10:
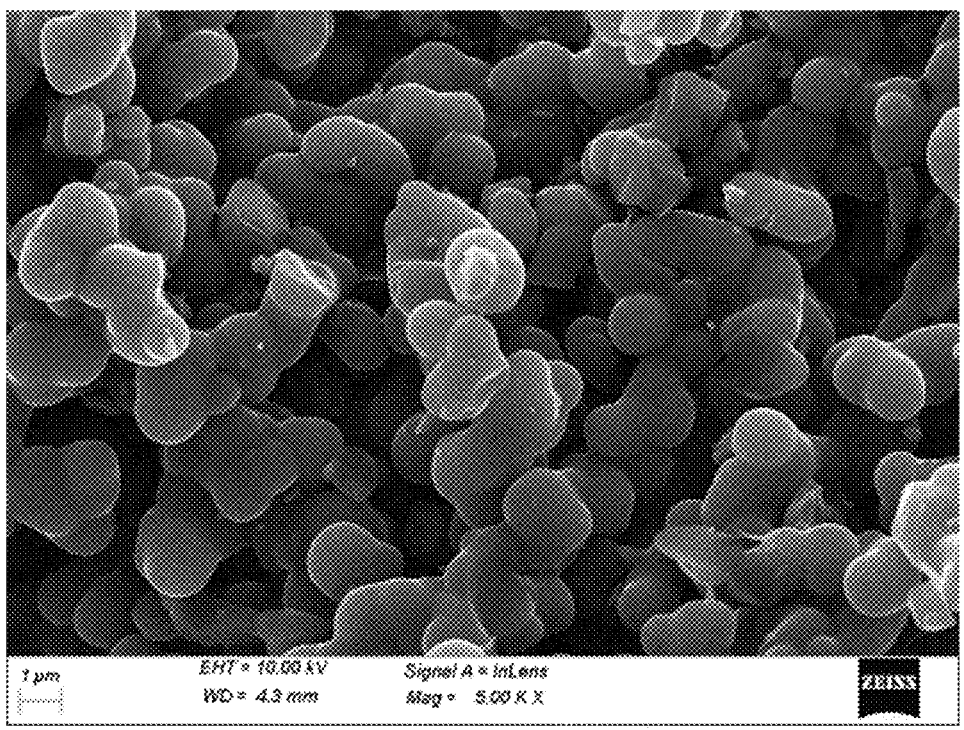
FIG. 10 is a scanning electron microscope image of a surface of a carbon matrix according to Comparative Example 1 of this application at a scanning magnification factor of Mag=5.00 KX.
Figure 11:
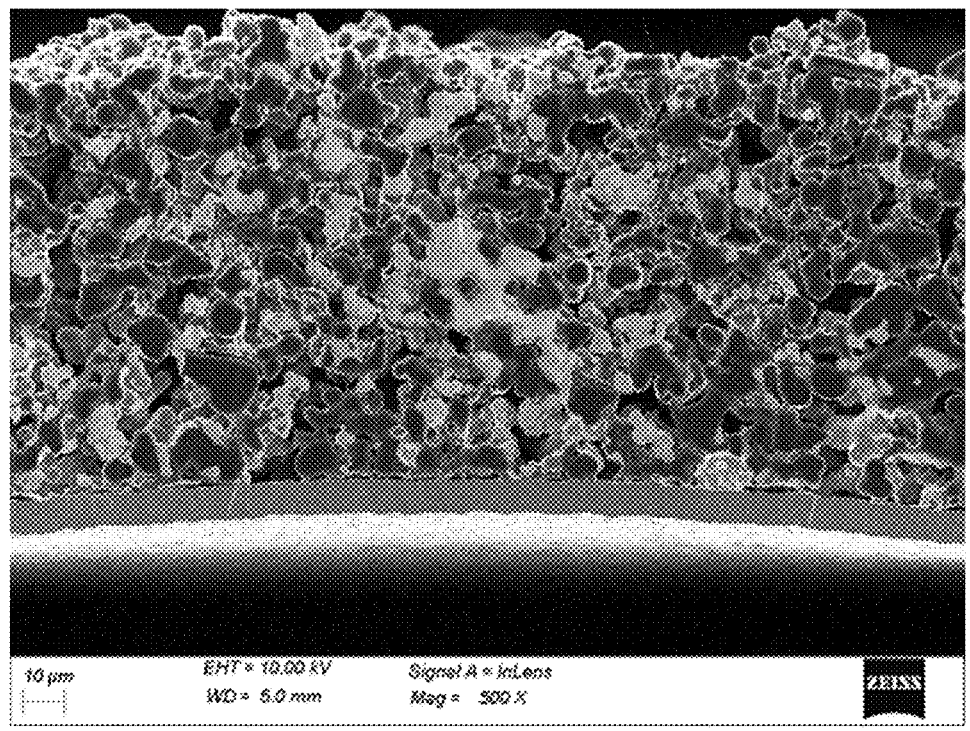
FIG. 11 is a scanning electron microscope image of a cross section of a carbon matrix according to Comparative Example 1 of this application at a scanning magnification factor of Mag=1.00 KX.
Figure 12:
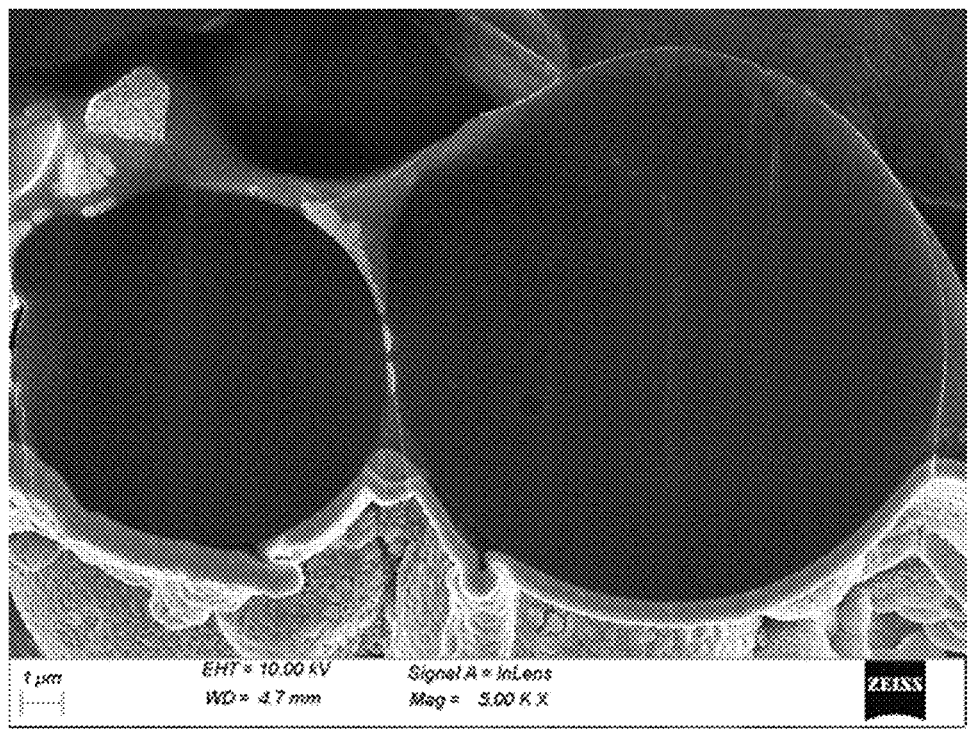
FIG. 12 is a scanning electron microscope image of a cross section of a carbon matrix according to Comparative Example 1 of this application at a scanning magnification factor of Mag=5.00 KX.

The carbon matrices prepared in Example 1 and Comparative Example 1 was used and a surface morphology image and a cross-sectional morphology image of the carbon matrix were observed. FIG. 5 is a scanning electron microscope image of a surface of a carbon matrix according to Example 1 of this application at a scanning magnification factor of Mag=1.00 KX. FIG. 6 is a scanning electron microscope image of a surface of a carbon matrix according to Example 1 of this application at a scanning magnification factor of Mag=5.00 KX. FIG. 7 is a scanning electron microscope image of a cross section of a carbon matrix according to Example 1 of this application at a scanning magnification factor of Mag=1.00 KX. FIG. 8 is a scanning electron microscope image of a cross section of a carbon matrix according to Example 1 of this application at a scanning magnification factor of Mag=5.00 KX. FIG. 9 is a scanning electron microscope image of a surface of a carbon matrix according to Comparative Example 1 of this application at a scanning magnification factor of Mag=1.00 KX. FIG. 10 is a scanning electron microscope image of a surface of a carbon matrix according to Comparative Example 1 of this application at a scanning magnification factor of Mag=5.00 KX. FIG. 11 is a scanning electron microscope image of a cross section of a carbon matrix according to Comparative Example 1 of this application at a scanning magnification factor of Mag=1.00 KX. FIG. 12 is a scanning electron microscope image of a cross section of a carbon matrix according to Comparative Example 1 of this application at a scanning magnification factor of Mag=5.00 KX.

As shown in FIG. 5 to FIG. 8, it can be learned that there are obvious gaps on the surface and inside of the carbon matrix produced in Example 1, while as shown in FIG. 9 to FIG. 12, it can be learned that there are no obvious gap on the surface and inside of the carbon matrix prepared in Comparative Example 1.

Test Example 2

The cycle number was tested for each of the batteries produced in Examples 1 to 25 and Comparative Examples 1 to 3. The produced button batteries were put on corresponding channels in a testing chamber and tested at a constant temperature of 25° C. The test results are given in Table 2.

Specific Testing Process:

The button battery was left standing on the corresponding channel in the testing chamber for 12 h; discharged to 2.5 V at a rate of 0.5 C; left standing for 5 min; and charged to 4.25 V at a constant current of 0.5 C. After the battery was left standing for 5 min, the above steps were repeated until discharge capacity of the battery was degraded to 80% of discharge capacity at the first cycle.

TABLE 2

Number of cycles of the batteries produced in Examples 1 to 25 and Comparative Example 1 to 3

| Item | Cycles |
| --- | --- |
| Example 1 | 1350 |
| Example 2 | 1220 |
| Example 3 | 1256 |
| Example 4 | 1300 |
| Example 5 | 1320 |
| Example 6 | 1324 |
| Example 7 | 1345 |
| Example 8 | 1360 |
| Example 9 | 1250 |
| Example 10 | 1325 |
| Example 11 | 1350 |
| Example 12 | 1335 |
| Example 13 | 1322 |
| Example 14 | 1345 |
| Example 15 | 1278 |
| Example 16 | 1390 |
| Example 17 | 1378 |
| Example 18 | 1280 |
| Example 19 | 1240 |
| Example 20 | 1235 |
| Example 21 | 1270 |
| Example 22 | 1210 |
| Example 23 | 1202 |
| Example 24 | 920 |
| Example 25 | 880 |
| Comparative Example 1 | 950 |
| Comparative Example 2 | 856 |
| Comparative Example 3 | 900 |

It can be learned from a comparison between Examples 1 to 25 and Comparative Examples 1 to 3, when the value of C1 of the silicon carbon composite material is larger, cycle life of the battery is longer. When the value of C1 of the silicon carbon composite material is less than 0.4, the cycle life of the battery is only 856 to 950 cycles. When the value of C1 of the silicon carbon composite material satisfies 0.4≤C1≤2, the cycle life of the battery is 1200 to 1360 cycles. When the value of C1 of the silicon carbon composite material is 2, the cycle life of the battery can reach 1360 cycles.

It can be learned from a comparison between Examples 1 to 25, when the value of C1 of the carbon matrix is greater than 2 or less than 0.8, the value of C1 of the silicon carbon composite material produced is less than 0.5, resulting in short cycle life of the battery.

Finally, it should be noted that the above embodiments are merely intended for describing the technical solutions of this application, but not for limiting this application. Although this application is described in detail with reference to the above embodiments, persons of ordinary skill in the art should understand that they may still make modifications to the technical solutions described in the above embodiments or make equivalent replacements to some or all technical features thereof. These modifications or replacements do not make the essence of the corresponding technical solutions depart from the scope of the technical solutions of the embodiments of this application, and should all fall within the scope of the claims and this specification of this application. In particular, various technical features mentioned in the embodiments can be combined in any manner provided that there is no structural conflict. This application is not limited to the specific embodiments disclosed in this specification, but includes all technical solutions falling within the scope of the claims.

What is claimed is:

1. A silicon carbon composite material, comprising:
a carbon matrix having a cross-linked porous structure internally; and
a silicon material that is at least partially distributed in the cross-linked porous structure; and
wherein a value of flexibility C1 of the silicon carbon composite material satisfies 0.4≤C1≤2, the flexibility being measured by
applying a pressure of 2t to the silicon carbon composite material, holding the pressure for 10 s and releasing the pressure for 100 s, repeating until the pressure is held and released for 20 times, recording a compacted density P1 at the 1st pressure holding, a compacted density P2 at the 20th pressure holding, a compacted density P3 at the 1st pressure releasing, and a compacted density P4 at the 20th pressure releasing, and calculating C1=(P4−P3)/(P2−P1), wherein the carbon matrix comprises a first region and a second region in sequence along a direction extending from a center to a surface, and the carbon matrix is composed of the first region and the second region, wherein a volume of the second region is twice a volume of the first region.

2. The silicon carbon composite material according to claim 1, wherein 0.8≤C1≤2.

3. The silicon carbon composite material according to claim 1, wherein P2−P1 is defined as M1 and P4−P3 is defined as N1, wherein 0.05≤M1≤0.18 and 0.08≤N1≤0.2; or wherein 0.08≤M1≤0.15 and 0.10≤N1≤0.18.

4. The silicon carbon composite material according to claim 1, wherein
a ratio of a number of pores with a pore size of 2 nm to 1000 nm in the first region to a number of pores with a pore size of 2 nm to 1000 nm in the second region is greater than 1; or
a ratio of a number of pores with a pore size of 2 nm to 500 nm in the first region to a number of pores with a pore size of 2 nm to 500 nm in the second region is greater than 1; or
a ratio of a number of pores with a pore size of 2 nm to 200 nm in the first region to a number of pores with a pore size of 2 nm to 200 nm in the second region is greater than 1.

5. The silicon carbon composite material according to claim 1, wherein a specific surface area (SSA) value of the silicon carbon composite material satisfies 1 cm²/g≤SSA≤10 cm²/g; or
the SSA of the silicon carbon composite material satisfies 3 cm²/g≤SSA≤7 cm²/g.

6. The silicon carbon composite material according to claim 1, wherein the silicon carbon composite material satisfies Dv10≤5 μm, Dv50≤8 μm, Dv90≤20 μm, and (Dv90−Dv10)/Dv50≥1.6.

7. The silicon carbon composite material according to claim 1, wherein a powder compacted density PD of the silicon carbon composite material under a pressure of 5t is ≤1.1 g/cm³.

8. The silicon carbon composite material according to claim 1, wherein the silicon material comprises any one or more of a silicon-oxygen compound, elemental silicon, or a silicon alloy.

9. A preparation method for the silicon carbon composite material according to claim 1, wherein the preparation method for silicon carbon composite material comprises: subjecting raw materials to first heat treatment to produce a solid resin, subjecting the solid resin to second heat treatment to volatilize a neutral solvent and produce a carbon precursor, subjecting the carbon precursor to pyrolysis and carbonization treatment to produce the carbon matrix, and incorporating the silicon material into the cross-linked porous structure of the carbon matrix; and
wherein the raw materials comprise a resin, a porogen, and the neutral solvent.

10. A negative electrode material, wherein the negative electrode material comprises the silicon carbon composite material according to claim 1.

11. A negative electrode plate, wherein the negative electrode plate comprises the negative electrode material according to claim 10.

12. An electrode assembly, wherein the electrode assembly comprises the negative electrode plate according to claim 11.

13. A battery cell, wherein the battery cell comprises the electrode assembly according to claim 12.

14. A battery, wherein the battery comprises the battery cell according to claim 13.

15. An electric apparatus, wherein the electric apparatus comprises the battery according to claim 14, wherein the battery is configured to supply electric energy.

16. A preparation method for a silicon carbon composite material, the silicon carbon composite material comprising:
a carbon matrix having a cross-linked porous structure internally; and
a silicon material that is at least partially distributed in the cross-linked porous structure, wherein a value of flexibility C1 of the silicon carbon composite material satisfies $0.4 \leq C1 \leq 2$, the flexibility being measured by applying a pressure of 2t to the silicon carbon composite material, holding the pressure for 10 s and releasing the pressure for 100 s, repeating until the pressure is held and released for 20 times, recording a compacted density P1 at the 1st pressure holding, a compacted density P2 at the 20th pressure holding, a compacted density P3 at the 1st pressure releasing, and a compacted density P4 at the 20th pressure releasing, and calculating $C1=(P4-P3)/(P2-P1)$; and
the preparation method comprising:
subjecting raw materials to first heat treatment to produce a solid resin;
subjecting the solid resin to second heat treatment to volatilize a neutral solvent and produce a carbon precursor;
subjecting the carbon precursor to pyrolysis and carbonization treatment to produce the carbon matrix; and
incorporating the silicon material into the cross-linked porous structure of the carbon matrix, wherein the raw materials comprise a resin, a porogen, and the neutral solvent.

17. The preparation method for silicon carbon composite material according to claim 16, wherein the second heat treatment is conducted at a treatment temperature of 150° C. to 400° C. for a treatment time of at least 10 hours.

18. The preparation method for silicon carbon composite material according to claim 16, wherein
a mass ratio of the resin to the neutral solvent ranges from 1:10 to 10:1, and a mass ratio of the resin to the porogen ranges from 1:5 to 10:1;
the resin comprises any one or more of phenolic resin, epoxy resin, or polyurethane;
the neutral solvent comprises any one or more of methanol, ethanol, ethylene glycol, polyethylene glycol, glycerol, or isopropanol; and
the porogen comprises any one or more of potassium chloride, sodium chloride, zinc chloride, sodium hydroxide, potassium hydroxide, sodium carbonate, potassium carbonate, sodium bicarbonate, phosphoric acid, sodium acetate, zinc acetate, nickel acetate, or ammonium acetate.

19. The preparation method for silicon carbon composite material according to claim 16, wherein the first heat treatment comprises standing at 60° C. to 150° C. for at least 10 hours.

20. The preparation method for silicon carbon composite material according to claim 16, wherein
the pyrolysis and carbonization treatment comprises sintering at 600° C. to 1600° C. for 1 to 3 hours; and
the pyrolysis and carbonization treatment is conducted at a temperature of 800° C. to 1000° C.

* * * * *